Oct. 18, 1966     C. B. ARENDS ETAL     3,279,239
METHOD AND APPARATUS FOR MEASUREMENT OF THERMAL CONDUCTIVITY
Filed April 29, 1964
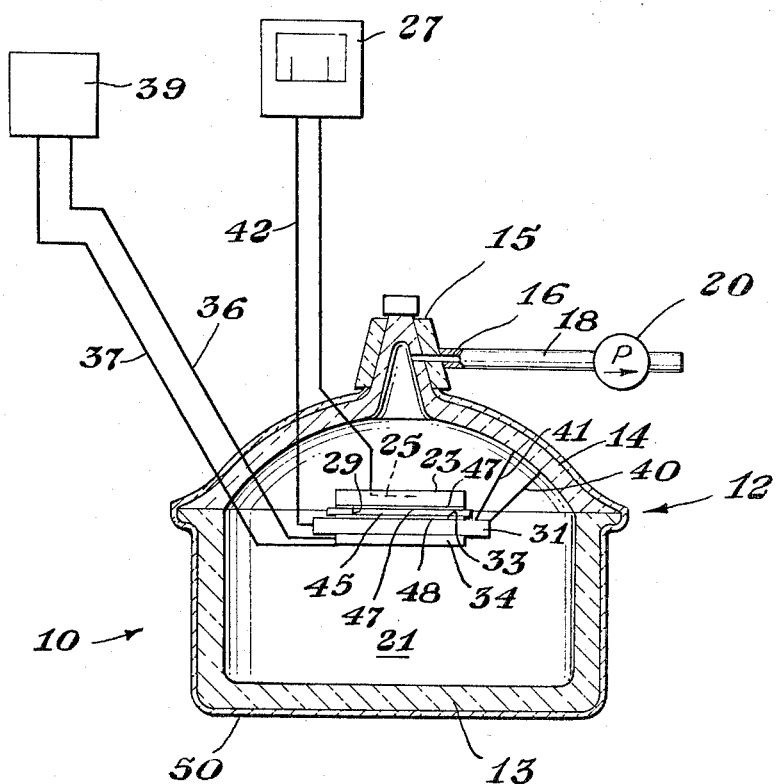
INVENTORS.
Charles B. Arends
Daniel H. Haigh
BY
AGENT 3,279,239
METHOD AND APPARATUS FOR MEASUREMENT
OF THERMAL CONDUCTIVITY
Charles B. Arends, Midland, and Daniel H. Haigh, Beaverton, Mich., assignors to The Dow Chemical Company, Midland, Mich., a corporation of Delaware
Filed Apr. 29, 1964, Ser. No. 363,453
5 Claims. (Cl. 73—15)

This invention relates to a method and apparatus for the measurement of thermal conductivity. It more particularly relates to a method and apparatus for the measurement of thermal conductivity of thin film.

Thermal conductivity of heavy or thick sections of materials are readily measured by conventional means. By the term "heavy sections" is meant sections having thickness of about 2½ millimeters and greater. Thin sections which are particularly difficult to measure include those having thicknesses of below about .25 millimeter to about .01 millimeter or less. Such film or thin sheet in this thickness range is an extremely difficult form to measure by conventional thermal conductivity techniques. Many sources of errors enter into the determination of the thermal conducitvity and often-times the results obtained are clearly erroneous. Particularly difficult to measure are thin packaging films including those of synthetic resinous foam such as polystyrene, polyurethanes and the like.

It is an object of this invention to provide an improved method and apparatus for the determination of the thermal conductivity of thin sheets.

A further object of this invention is to provide an accurate method and apparatus for the determination of thermal conductivity of thin sheets.

Another object of the invention is to provide a simple method and apparatus for the determination of the thermal conductivity of thin sheets.

These benefits and other advantages in accordance with the method of the present invention are achieved by positioning a film or sheet to be measured between the heat source and a heat sink, maintaining the film to be measured in thermal contact with the heat source and the heat sink, maintaining the heat source, heat sink and the film to be measured under an absolute pressure of up to about .1 millimeter of mercury, applying heat to the heat source, measuring the temperature differential between the source and sink with time and subsequently calculating the thermal conductivity of the film.

The apparatus in accordance with the invention comprises a housing defining chamber adapted to be evacuated to an absolute pressure of at most 0.1 millimeter of mercury, a heat sink and a heat source having surfaces adapted to engage opposed faces of a sample, the heat sink and heat source being maintained in a position of minimal thermal contact with the housing, means to provide heat to the heat source and means to determine the temperature of the heat source and the heat sink.

Further features and advantages of the present invention will become more apparent from the following specification taken in connection with the drawing wherein:

The figure depicts a schematic partly-in-section view of an apparatus in accordance with the present invention generally designated by the reference numeral 10. The apparatus 10 comprises in cooperative combination a housing 12 comprising a bottom section 13, and a top section 14. A valve 15 is provided in the top section 14. A passageway 16 is formed in the valve 15. The passageway 16 is in operative communication with the line 18 which in turn is in operative communication with a vacuum source or pump 20 which will evacuate a chamber 21 of the housing 12. Disposed within the chamber 21 is a heat sink 23. A temperature indicating means or thermocouple 25 is embedded within the heat sink 23 and passes through the top portion 14 of the housing 12 to a temperature indicating and/or recording means 27. The heat sink 23 has a sample engaging face 29. A heat source 31 having a work engaging face 33 is oppositely disposed to face 29 of the heat sink 25. A heating means 34 is affixed to the heat source 31. The heat source 34 is in operative communication with the power supply leads 36 and 37 which in turn terminate remote from the heating means 34 at the power source 39. The heat source is maintained in minimum thermal contact with the housing 12 by the suspending means 40 and 41. Additional support is provided by the power leads 36, 39 and thermocouple lead 42 which passes through the upper portion 14 of the housing 12 and is in operative communication with the temperature indicating means 27. A sample 45 of a thin sheet like material is disposed between the surface 29 of the heat sink 25 and surface 33 of the heat source 31. The thermal contact of the film 45 with the heat source 31 and heat sink 25 is assured by thin layers 47 and 48 of a thermally conductive grease. Beneficially, an insulating coating 50 is applied to the surface of the housing 12. Such insulation may comprise a mirror-like layer formed upon the outer surface of a glass housing or alternately, if a metal housing is employed with a bright inner surface conventional insulation layers such as asbestos, paper, cloth and the like materials are utilized to prevent heat loss from the vessel. Beneficially the heat source and heat sink are prepared from metals having a high thermal conducivity such as copper, aluminum, magnesium, silver, and alloys having generally similar values of thermal conducitvity. Beneficially, to insure adequate contact of the heat source and sink to the sample being evaluated, a grease of high thermal conducivity and low vapor pressure is employed between the sample and the adjacent faces of the heat sink and source and the surface of the sample being measured. Such a grease is readily prepared by dispersing one part by weight of aluminum powder (or other powdered metal of similar or higher thermal conductivity) in two parts by weight of the low vapor pressure grease. Generally the metal powder should have a particle size below about 100 microns. A generally spherical particle is found to give higher thermal conductivity than flakes or platelets. Higher weight proportions of the spherical particles may be used than irregularly shaped particles or platelike particles for a given consistency or fluidity of the grease. Suitable greases include those generally utilized for high vacuum work. Particularly advantageous are the commercially available silicone high vacuum greases which exhibit an extremely low vapor pressure and do not provide solvent action on most thermoplastic resinous samples. The greases or grease-like compositions or thermally conductive liquid such as mercury is readily utilized in place of hereinbefore described composition.

In operation of the apparatus and practice of the method of the present invention the face 33 of the heat source 31 is coated with a light layer of a thermally conductive grease and the sample to be evaluated is placed thereon in such a manner that the entrapment of air bubbles between the sample and the grease is minimized. A thin layer of grease is placed on the surface 29 of the heat sink 25 and the heat sink positioned on the film thus forming a sandwich with the sample to be evaluated lying between the heat source and the heat sink. The housing is then closed with respect to the surrounding atmosphere and evacuated to a pressure of at least .1 millimeter of mercury and beneficially to an absolute pressure of $10^{-2}$ millimeters of mercury or even lower to remove the atmosphere within the chamber and to remove any bubbles which may exist adjacent the surface of the material being tested. Oftentimes it is advantageous to initially raise the temperature of the heat sink and the heat source above the temperature at which the thermal conductivity measurement will be made in order to assure that a maximum quantity of gas has been removed. When a suitable temperature has been achieved within the housing the temperature of the heat source is raised by means of the heater 34 and the associated power supply 39. Beneficially, the temperature of the heat source and heat sink is observed and correlated with time, as the heat transfer area between the heat source and the heat sink is readily measured the thermal conductivity can then be calculated in accordance with the equation:

$$K = \frac{CmL}{A(T_1 - T_2)} \frac{dT}{dt}$$

wherein L is the thickness of the sample, $Cm$ is the heat capacity of the heat sink, A is the area of the heat sink, $$\frac{dT}{dt}$$

is the rate of temperature rise. In operation, conditions are chosen so that the rate of temperature rise of the heat source and the heat sink is equal. If the rates are not readily equalized the term $T_1 - T_2$ may be corrected by determining the temperature differential without a sample and subsequently calibrating by means of a thin sheet of brass of known thermal conductivity. This temperature difference may then be subtracted from the observed temperature difference and the remainder used in place of the term $T_1 - T_2$.

By way of further illustration a sheet of molded polyethylene having a thickness of 0.39 millimeter was positioned between a heat source and a heat sink in an apparatus substantially as illustrated in the figure. The sample contacting surfaces were treated with a thermally conductive grease prepared by admixing two parts by weight of a high vacuum silicon stop cock grease with one part by weight of powdered aluminum particles with diameters ranging from about 10 to about 100 microns. The pressure within the housing was reduced to $10^{-2}$ millimeters of mercury absolute. At a heating rate of 0.077° centigrade per second a temperature difference of 5° centigrade was observed when the heat sink reached a temperature of 100° centigrade. At an identical heating rate with a sheet of brass (a thickness about 0.0382 centimeters) a temperature difference of 2° centigrade was observed. The corrected temperature difference is 3° centigrade. The heat capacity of the heat sink was 24.06 calories per degrees centigrade. The area of the heat sink in contact with the polyethylene was 45.6 square centimeters. The observed thermal conductivity is calculated as:

$$K = \frac{24.06 \times .0039}{45.6 \times 3.0} \times .007 = 5.3 \times 10^{-4} \frac{\text{cal}}{°K\text{-}Cm\text{-sec.}}$$

The maximum precision with the particular equipment employed permitted the temperature difference to be read with a precision of ±0.5° centigrade.

In a similar manner the thermal conductivity of other materials such as paper, foamed or expanded film, having thickness of from about ½ to 20 mls. and the like is readily determined.

As is apparent from the foregoing specification, the method and apparatus of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method for determining the thermal conductivity of a solid film or sheet; the steps of the method comprising;

positioning between a heat source and a heat sink a solid film or sheet to be tested;

maintaining the film in thermal contact with the heat source and the heat sink; continuously changing the temperature of the heat source;

measuring the temperature of the sink as a function of time; simultaneously measuring the temperature differential between the source and the sink as the temperature of the heat source is changed;

maintaining the heat source, the heat sink and the film to be measured under an absolute pressure of up to about 0.1 mm. of mercury; and carrying out the hereinabove delineated steps in a thermally reflective enclosure, whereby the thermal conductivity of the film is calculated from the formula $$K = \frac{CmL}{A(T_1 - T_2)} \frac{dT}{dt}$$

wherein K is the thermal conductivity, L is the thickness of the sample, $Cm$ is the heat capacity of the heat sink, A is the area of the heat sink, $$\frac{dT}{dt}$$

is the rate of temperature rise, and $T_1 - T_2$ is the temperature differential between the heat source and sink.

2. A method for determining the thermal conductivity of a film or sheet wherein the film is positioned between a heat source and a heat sink;

applying to a surface of the heat source and a surface of the heat sink a thermally conductive grease in sufficient quantity to assure contact of the grease with the film or sheet being tested;

applying heat to the heat source; reducing the pressure on the heat source, heat sink, film and grease to a pressure up to about 1 mm. of mercury;

raising the temperature of the heat source and heat sink to about the temperature at which the thermal conductivity is to be determined; subsequently cooling the heat source, heat sink and film; maintaining the film in thermal contact with the heat sink;

measuring the temperature of the source as a function of time; simultaneously measuring the differential temperature between the source and the sink;

maintaining the heat source, the heat sink and the film to be measured under an absolute pressure of up to about 0.1 mm. of mercury, whereby the thermal conductivity of the film is calculated from the formula $$K = \frac{CmL}{A(T_1 - T_2)} \frac{dT}{dt}$$

wherein K is the thermal conductivity, L is the thickness of the sample, $Cm$ is the heat capacity of the heat sink, A is the area of the heat sink, $$\frac{dT}{dt}$$

is the rate of temperature rise, and $T_1 - T_2$ is the temperature differential between the heat source and sink.

3. An aparatus for the measurement of the thermal conductivity of sheet and film comprising a housing defining a chamber; the chamber adapted to be evacuated to an absolute pressure of at most 0.1 mm. of mercury;

a heat sink and a heat source having surfaces adapted to engage opposed surfaces of a sheet-like sample; the surfaces having a coating of thermally conductive grease thereon adapted to engage the sample; the heat sink and the heat source being maintained in a position of minimal thermal contact with the housing;

means to provide heat to the heat source;

means to evacuate the chamber; means to record the temperature of the heat source and the heat sink with time; and a thermally reflective surface in cooperative combination with the housing adapted to prevent loss of heat from the chamber by radiation whereby the thermal conductivity of the film is calculated from the formula $$K = \frac{CmL}{A(T_1 - T_2)} \frac{dT}{dt}$$

wherein K is the thermal conductivity, L is the thickness of the sample, $Cm$ is the heat capacity of the heat sink, A is the area of the heat sink, $$\frac{dT}{dt}$$

is the rate of temperature rise, and $T_1 - T_2$ is the temperature differential between the heat source and sink.

4. The method of claim 1 including the step of applying to a surface of the heat source and a surface of the heat sink a thermally conductive grease at least in sufficient quantity to assure contact of the grease with the film or sheet being tested.

5. The apparatus of claim 1, wherein the temperature indicating the means is a thermocouple disposed within the heat source and a thermocouple disposed within the heat sink.

References Cited by the Examiner

FOREIGN PATENTS 119,361    8/1958    Russia.

OTHER REFERENCES

Wiiks, J. L., et al.: "Apparatus for the Measurement of the Thermal Conductivity of Solids," in the Review of Scientific Instruments, 24 (11), pp. 1054–1057, November 1953.

Moss, M.: "Apparatus for Measuring the Thermal Conductivity of Metals in Vacuum at High Temperatures," in the Review of Scientific instruments, 26 (3), pp. 276–279, March 1955.

RICHARD C. QUEISSER, *Primary Examiner.*

J. C. GOLDSTEIN, *Assistant Examiner.*